UNITED STATES PATENT OFFICE.

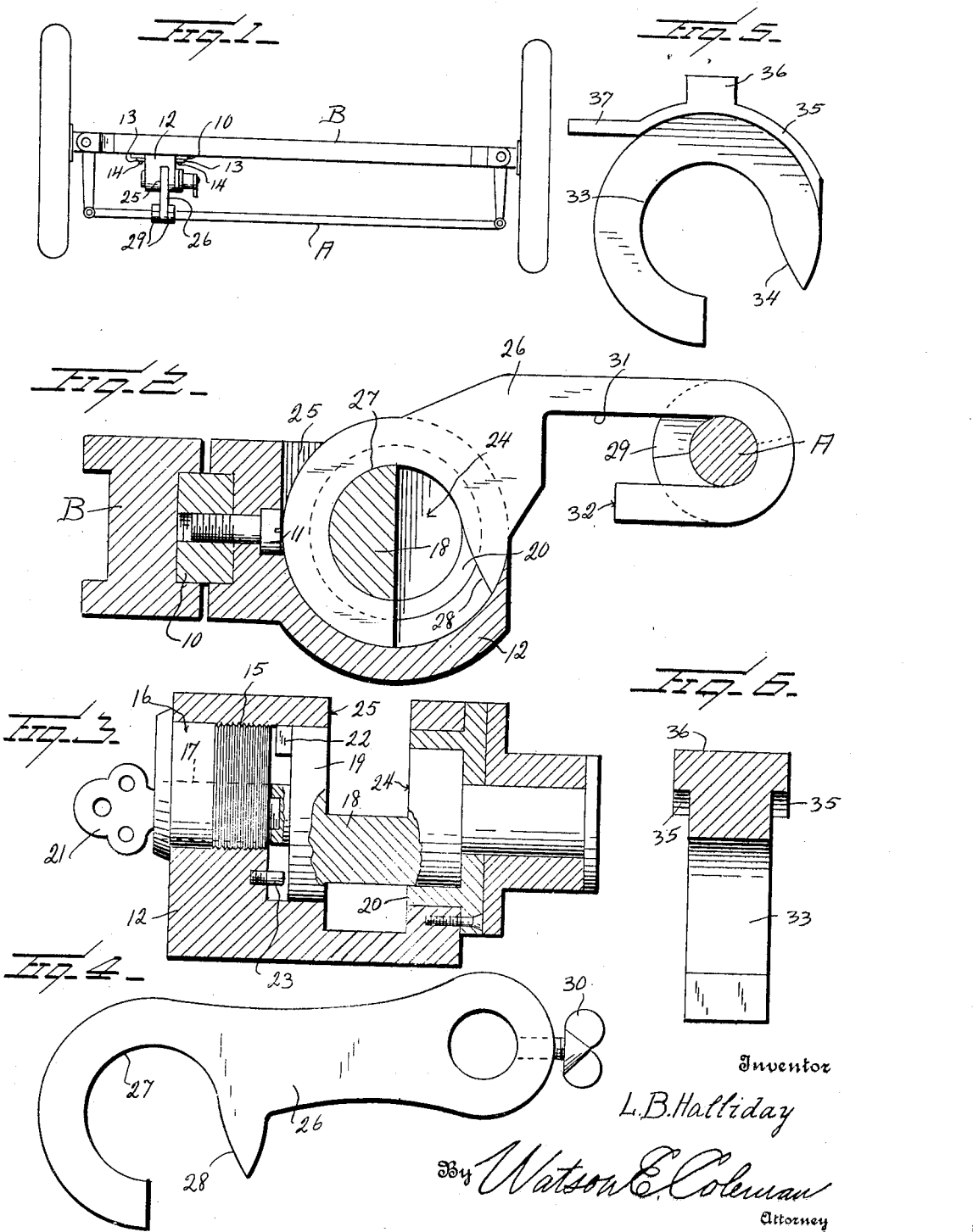

LOUIS B. HALLIDAY, OF CINCINNATI, OHIO.

AUTOMOBILE-LOCK.

1,350,497.  Specification of Letters Patent.  Patented Aug. 24, 1920.

Application filed December 8, 1919. Serial No. 343,164.

*To all whom it may concern:*

Be it known that I, LOUIS B. HALLIDAY, a citizen of the United States, residing at Cincinnati, in the county of Hamilton and State of Ohio, have invented certain new and useful Improvements in Automobile-Locks, of which the following is a specification, reference being had to the accompanying drawings.

This invention relates to automobile locks, and particularly to means for locking the steering rod of an automobile or locking the gear shifting lever to thus prevent the practical use of the automobile.

The general object of my invention is to provide a very simple and thoroughly effective mechanism to this end which includes a clamp or hasp, as it may be termed, adapted to be mounted upon or engaged with the steering rod of the automobile or with the gear shifting lever, and a locking mechanism which may be mounted upon the front axle or upon the floor of the automobile, with which said clamp or hasp is adapted to engage and lock to thereby prevent any movement of the part with which the clamp is engaged and thus prevent the practical operation of the automobile.

A further object is to provide a mechanism of this character including a rotatable locking member disposed in the casing, this casing being fixedly mounted, and the casing being adapted to be mounted upon the axle of an automobile, and provide a mud shield which is adapted to be disposed in the opening of the casing when the hasp is detached therefrom so as to prevent the entrance of mud into the lock casing, the locking devices acting to lock the shield in place.

A further object is to provide a hasp or clamp which may be so formed as to be capable of being removed entirely from the gear shifting lever or steering rod, but which, when in place and locked, cannot be removed from the steering rod or from the gear shifting lever.

Other objects will appear in the course of the following description.

My invention is illustrated in the accompanying drawings, wherein:—

Figure 1 is a plan view of the front axle of an automobile illustrating the application of my device thereto;

Fig. 2 is a sectional view through the axle of an automobile and through the steering rod showing my improved lock in section, the hasp being in elevation;

Fig. 3 is a longitudinal sectional view through the lock;

Fig. 4 is an elevation of another form of hasp;

Fig. 5 is a side elevation of the mud guard or shield;

Fig. 6 is a vertical section therethrough.

I have shown my device as attached to the steering rod and axle of the automobile respectively, but I do not wish to be limited to this.

Referring to the drawings, A designates the steering rod of an automobile and B the front axle thereof. Welded or otherwise securely attached to the front axle so that it cannot be removed is a plate 10, and attached to this plate by an interior screw 11 is a lock casing 12. This lock casing is formed at its ends with integrally slotted ears 13 through which screws 14 may be passed which extend into the plate 10, thus holding the lock casing firmly in place to the axle and preventing its detachment without taking the lock apart. The lock casing 12 is formed to provide a cylindrical chamber 15 within which is disposed the body 16 of a "Yale" pin tumbler lock of the usual construction and having a rotatable barrel 17 formed with the usual keyhole. This barrel is operatively connected to a locking member 18 which is, generally speaking, cylindrical in form and which is enlarged at one end, as at 19. This end fits snugly within the interior of the casing and the reduced end of this locking member 18 is supported within the lock casing by means of a bushing 20. Thus, the locking member 18 may be rotated by means of a key 21 inserted into the barrel 17. Preferably the locking member 18 is provided at one point with a stop 22 and there is a pin 23 projecting from the lock casing into the chamber inclosing the locking member 18 and this stop is adapted to engage with this stop pin so as to limit the rotation of the locking member in one direction. The locking member, midway of its length, is cut away so as to provide a slot 24, the bottom of this slot extending diametrically across the cylindrical locking member. The casing is also cut away, as at 25, in alinement with this groove or recess 24 so as to leave an opening which extends from the rear of the lock casing over its top and half way down the front of the lock casing. The rear wall of this opening in the lock casing extends straight downward, while the bottom of this cut away portion gradually inclines upward and outward so as to leave a thin edge to the lock casing at the forward end of this opening.

Mounted upon the steering rod A is a hasp or clamp, as it may be called, designated generally 26, this clamp having at its end an opening for the passage of the steering rod A and at its free end the clamp is formed with a central passage 27 adapted to embrace and receive the locking member, this opening having a diameter equal to that of the diameter of the locking member. One wall of the opening or passage is cut away, as at 28, leaving a throat opening into the passage 27, one wall of this throat being radial to the center of the passage 27 and the other wall being tangential thereto. This permits the clamp or hasp to be shifted to a position where it will embrace the locking member, and then by means of the key 21 this locking member is turned to such a position that the grooved face of the locking member is turned toward the front of the lock and this locks the hasp from any opening movement in a manner which will be obvious from Fig. 2. The hasp or clamp 26 is preferably supported on the steering rod between two sectional collars 29 which are welded on the steering rod, and which may be welded in such position on the steering rod that when the clamp is engaged with the lock, the steering rod will have been previously shifted to a position where the steering wheels are cramped or turned. Then when the clamp is locked by the means described, it is obvious that the machine cannot be operated without unlocking the steering rod, because even if the engine be started, the cramping of the wheels would cause the machine to turn in a circle and it cannot possibly be steered.

The clamp may have an opening, as shown in Fig. 4, with a set screw 30 whereby it may be held fast on the steering rod when locked, or the set screw may be turned out to permit the rotative movement of the clamp on the steering rod to detach it from the lock, and then this clamp be allowed to hang loosely on the steering rod and shift with it as the steering rod is shifted. Preferably, however, I use the form of clamp or hasp shown in Fig. 2, wherein the hasp 26 is provided at its rear end with a longitudinally extending slot 31 having a throat 32 opening upon the face of the clamp and permitting the clamp to be placed upon the steering rod or detached therefrom. When the clamp is placed on the steering rod and engaged with the locking device, it will be obvious that it is impossible to remove the clamp from the steering rod. When, however, the lock has been unlocked and the clamp is shifted out of engagement with the lock, then it may be readily detached from the steering rod in an obvious manner.

It is, of course, obvious that when the hasp is thrown back to its unlocked position some means must be provided to prevent mud from being thrown into the lock casing and clogging the operation of the locking member 18. To this end I provide a mud-guard, shown in Fig. 5, this mud-guard having an approximately circular portion 33 formed to provide a throat 34, one wall of this throat being radial and the opposite wall tangential to the interior face of the circular portion 31. The circular portion 31 is provided with a cap 35 which extends laterally beyond the member 32 and is provided with a lug 36 constituting a handle whereby it may be manipulated, and an outwardly projecting flange 37. In the use of this device, after the hasp has been unlocked and raised, the guard or shield is put in place, with the extension 37 of the cap 35 extending rearward over the top of the lock casing, and then the locking member 18 is rotated to its locked position, which will, of course, lock the disk cover or shield in place from removal until the locking member 18 is again turned to its unlocking position. This, of course, entirely prevents the entrance of mud, dirt, or other foreign matter into the lock casing and keeps the locking member at all times clean so as not to impede the free entrance of the hasp.

It will be seen that with this device, the automobile will be readily locked from use so as to prevent its use, and that this lock is of such a nature that it cannot be readily broken nor removed without taking the locking member 18 entirely out of the lock casing.

It is obvious that I do not wish to be limited to the use of a lock of the particular construction illustrated as the means for locking the locking member, as other forms of rotary locks may be used for this purpose, nor do I wish to be limited to the particular form of the locking hasp illustrated.

I have heretofore referred to the use of this device for locking the wheels in a cramped position, that is turned so that if the automobile be started, it would have to move in a circle. In some States, however, the law will not permit automobiles to be so locked and will only permit them to be locked so that the car can be moved forward or backward in case of fire. It will be understood that as illustrated in the drawings, the collars 29 are welded upon the steering rod in such position that the steering wheels are straight ahead. This permits the backward or forward movement of the car and prevents it being turned to the right or left.

If the lock is used for locking the gear shifting lever, no change is made in the lock but simply a change in the location of the parts. In this case, the lock casing 12 is fastened to the floor of the automobile and the hooked hasp or clamp 26, shown in Fig. 2, is engaged around the gear shifting lever and the other end of the clamp or hasp is disposed in the lock casing in the manner heretofore described, and this will prevent the gear shifting lever from being pulled backward and the gears, therefore, can not be shifted. It will be understood, of course, under these circumstances the mud shield need not be used, but it must be used where the lock is designed for use with the steering rod. Many modifications might be made in the details of construction and arrangement of parts without departing from the spirit of the invention.

I claim:—

1. In an automobile, the combination with the steering rod thereof, of a lock casing mounted upon a fixed part of the automobile adjacent the steering rod and having a key-actuated locking member therein, and a hasp rotatably carried on the steering rod and adapted to be shifted into engagement with the lock casing and locked from detachment therein by a rotation of the locking member, the steering rod being so formed that the hasp, when locked, prevents longitudinal movement of the steering rod.

2. In an automobile, the combination with the steering rod thereof, of a hasp carried by the steering rod, and a key-actuated locking device mounted upon a fixed portion of the automobile adjacent the steering rod and with which said hasp is adapted to engage and by which it is adapted to be locked, the steering rod being so formed that when the hasp is in engagement with the locking device, the steering rod can not be longitudinally shifted to different positions.

3. In an automobile, the combination with the steering rod thereof, of a lock casing mounted adjacent the steering rod, a key-actuated, rotatable locking member mounted in the lock casing, the lock casing being slotted, and a hasp swingingly mounted upon the steering rod and having a head adapted to be inserted through the slot of the lock casing into engagement with the locking device therein, said locking device when shifted by a key locking the head of the hasp from disengagement from the lock casing, the steering rod being so formed that when the hasp is in engagement with the lock casing, the steering rod can not be longitudinally shifted to steer the machine.

4. In an automobile, the combination with the steering rod thereof, of a lock casing mounted rigidly adjacent the steering rod, a rotatable, key-actuated barrel mounted in the lock casing, a rotatable, approximately cylindrical locking member with which the barrel is engaged, a rotation of the barrel causing the rotation of the locking member, the locking member having a groove extending inward from one face, and a hasp swingingly mounted upon the steering rod, the head of the hasp being formed with a circular opening adapted to fit the cylindrical member when the head is disposed through the slot in the lock casing, and there being a throat extending from the exterior of the head into said opening, the hasp being mounted upon the steering rod for free swinging movement but being held from longitudinal movement relative to the steering rod.

5. In an automobile, the combination with the steering rod thereof, of a lock casing mounted rigidly adjacent the steering rod, a rotatable, key-actuated barrel mounted in the lock casing, a rotatable, approximately cylindrical locking member with which the barrel is engaged, a rotation of the barrel causing the rotation of the locking member, the locking member having a groove extending inward from one face, and a hasp swingingly mounted upon the steering rod, the head of the hasp being formed with a circular opening adapted to fit the cylindrical member when the head is disposed through the slot in the lock casing, and there being a throat extending from the exterior of the head into said opening, and means on the steering rod holding the steering rod from longitudinal movement independent of the hasp but permitting the hasp to swing on the rod, the hasp having a passage for said rod and having a slot entering said passage, whereby the hasp may be removed from the rod.

6. In an automobile, the combination with the steering rod thereof, of a lock casing mounted rigidly adjacent the steering rod, a rotatable, key-actuated barrel mounted in the lock casing, a rotatable, approximately cylindrical locking member with which the barrel is engaged, a rotation of the barrel causing the rotation of the locking member, the locking member having a groove extending inward from one face, and a hasp swingingly mounted upon the steering rod, the head of the hasp being formed with a circular opening adapted to fit the cylindrical member when the head is disposed through the slot in the lock casing, and there being a throat extending from the exterior of the head into said opening, and means on the steering rod holding the steering rod from longitudinal movement independent of the hasp but permitting the hasp to swing on the rod, the hasp having a slot through which the rod passes, this slot at its inner end being formed with a throat extending to the exterior of the hasp, whereby when the hasp is unlocked it may be shifted rearward and then released from the rod.

7. In an automobile, the combination with the steering shaft, of means for locking the steering shaft from steering movement including a lock casing rigidly mounted with reference to the steering rod and adjacent thereto and having a slot, a hasp swingingly mounted upon the steering rod and having a head adapted to be inserted in said slot, key-actuated locking means within the lock casing for engaging said head and holding it from detachment from the lock casing, and a guard or cover having a portion adapted to be inserted through said slot when the hasp is detached from the lock casing, said portion being adapted to be locked in place by the locking mechanism in the lock casing and covering the slot in the casing to thereby prevent the entrance of foreign matter thereto.

8. In an automobile, the combination with a fixed portion thereof and a relatively movable controlling member, of a lock casing mounted upon the fixed portion, a rotatable, key-actuated barrel in the lock casing, a rotatable, approximately cylindrical locking member with which the barrel is engaged, a rotation of the barrel causing the rotation of the locking member, the locking member having a groove extending inward from one face, and a hasp swingingly mounted upon the controlling member, the head of the hasp being formed with a circular opening adapted to fit the cylindrical member when the hasp is disposed through the slot in the lock casing and there being a throat extending from the exterior of the head into said opening.

9. An automobile lock comprising a lock casing, a rotatable key actuated locking member rotatably mounted in the casing, that portion of the rotatable member which is disposed within the casing having one-half of its cross sectional area cut away, the bottom of said cut away portion extending across the axis of the member, and a hasp having a head formed with a central opening and with a throat extending through the opening to the periphery of the hasp, the throat being large enough to accommodate that portion of the rotatable locking member disposed within the casing and permit the detachment of the hasp therefrom, and the casing being open on one side to permit the insertion of the hasp into engagement with the locking member, said hasp being locked from detachment from said locking member by a rotation of the locking member a predetermined distance in one direction.

10. An automobile lock comprising a lock casing, a key-actuated locking member rotatably in the casing, and a hasp having a head adapted to be engaged by said locking member and locked from detachment from said locking member by a rotation of the locking member a predetermined distance in one direction, said hasp at the end opposite said head being longitudinally slotted and having an opening extending from the edge face of the hasp into said slot at the inner end of the slot.

11. A locking device for automobiles including a lock casing, a rotatable, key-actuated barrel mounted in the casing, a rotatable, approximately cylindrical locking member with which the barrel is engaged for common rotation, the locking member having a groove extending inward from one face, and a hasp having a head formed with a circular opening adapted to fit the cylindrical member when the head is disposed through the slot in the lock casing and there being a throat extending from the exterior of the head into said opening, the opposite end of the hasp being formed with a longitudinally extending slot having a throat at its inner end extending to the edge face of the hasp.

In testimony whereof I hereunto affix my signature.

LOUIS B. HALLIDAY.